US010171791B2

(12) United States Patent
Hwang et al.

(10) Patent No.: US 10,171,791 B2
(45) Date of Patent: *Jan. 1, 2019

(54) METHODS AND APPARATUS FOR CONDITIONAL DISPLAY OF A STEREOSCOPIC IMAGE PAIR

(71) Applicant: QUALCOMM Incorporated, San Diego, CA (US)

(72) Inventors: Hau Hwang, San Diego, CA (US); Szepo Robert Hung, Carlsbad, CA (US); Ruben Manuel Velarde, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 15/190,060

(22) Filed: Jun. 22, 2016

(65) Prior Publication Data
US 2016/0301913 A1 Oct. 13, 2016

Related U.S. Application Data

(63) Continuation of application No. 13/249,028, filed on Sep. 29, 2011, now Pat. No. 9,402,065.

(51) Int. Cl.
*H04N 13/00* (2018.01)
*H04N 13/128* (2018.01)
(Continued)

(52) U.S. Cl.
CPC ......... *H04N 13/128* (2018.05); *H04N 13/144* (2018.05); *H04N 13/178* (2018.05); *H04N 2013/0081* (2013.01)

(58) Field of Classification Search
CPC .................. H04N 13/0022; H04N 13/0033
See application file for complete search history.

(56) References Cited

U.S. PATENT DOCUMENTS

| 6,125,198 A | 9/2000 | Onda |
| 7,254,265 B2 | 8/2007 | Naske et al. |
| (Continued) | | |

FOREIGN PATENT DOCUMENTS

| CN | 1643939 A | 7/2005 |
| CN | 1643939 A | 7/2005 |
| (Continued) | | |

OTHER PUBLICATIONS

De Silva, L.C et al., "Automatic facial feature detection for model based coding", The Department of Electrical Engineers, Stevenage, GB, 2000, XP002690893, Database accession No. 6868412, & Visual Communications and Image Processing 2000, Jun. 20-23, 2000 Perth, WA,Australia, vol. 4067, 2000, pp. 1126-1137.

(Continued)

*Primary Examiner* — Jonathan R Messmore
(74) *Attorney, Agent, or Firm* — Shumaker & Sieffert, P.A.

(57) ABSTRACT

Apparatus and methods for conditional display of a stereoscopic image pair on a display device are disclosed. In some aspects, a vertical disparity between two images is corrected. If the corrected vertical disparity is below a threshold, a three dimensional image may be generated based on the correction. In some cases, the corrected vertical disparity may still be significant, for example, above the threshold. In these instances, the disclosed apparatus and methods may display a two dimensional image.

20 Claims, 10 Drawing Sheets

(51) Int. Cl.
*H04N 13/144* (2018.01)
*H04N 13/178* (2018.01)

(56) References Cited

U.S. PATENT DOCUMENTS

| | | | |
|---|---|---|---|
| 7,844,107 | B2 | 11/2010 | Jeong et al. |
| 2003/0128871 | A1 | 7/2003 | Naske et al. |
| 2003/0156751 | A1 | 8/2003 | Lee et al. |
| 2004/0208357 | A1 | 10/2004 | Tokuhashi et al. |
| 2007/0139612 | A1 | 6/2007 | Butler-Smith et al. |
| 2008/0085049 | A1 | 4/2008 | Naske et al. |
| 2011/0141227 | A1 | 6/2011 | Bigioi et al. |
| 2011/0229014 | A1 | 9/2011 | Knee et al. |
| 2012/0050500 | A1 | 3/2012 | Yamaguchi |
| 2012/0314937 | A1 | 12/2012 | Kim et al. |
| 2013/0002814 | A1 | 1/2013 | Park et al. |
| 2013/0038701 | A1 | 2/2013 | Hung et al. |
| 2013/0083002 | A1 | 4/2013 | Hwang et al. |

FOREIGN PATENT DOCUMENTS

| | | | |
|---|---|---|---|
| EP | 1489857 | A1 | 12/2004 |
| EP | 1742488 | A1 | 1/2007 |
| EP | 2362668 | A2 | 8/2011 |
| JP | H11355808 | A | 12/1999 |
| JP | 2003018619 | A | 1/2003 |
| JP | 2003061116 | A | 2/2003 |
| JP | 2011077984 | | 4/2011 |
| JP | 2011077984 | A | 4/2011 |
| JP | 2011082757 | A | 4/2011 |
| KR | 20110097690 | A | 8/2011 |
| WO | 2011141227 | A1 | 11/2011 |
| WO | WO-2011162037 | A1 | 12/2011 |

OTHER PUBLICATIONS

International Search Report and Written Opinion—PCT/US2012/057232—ISA/EPO—dated Feb. 18, 2013.
Invitation to Pay Additional Fees—PCT/US2012/057232, International Search Authority—European Patent Office —dated Dec. 3, 2012.
Ratakonda K, "Real-time digital video stabilization for multi-media applications Circuits and Systems," Circuits and Systems, 1998, ISCAS 98. Proceedings of the 1998 IEEE International Symposium on Monterey, 1998, 4, 69-72.
Written Opinion (PCT Rule 66)—PCT/US2012/057232—ISA/EPO—dated Oct. 21, 2013.
Response to Written Opinion dated Oct. 21, 2013, from International Application No. PCT/US2012/057232, filed on Dec. 18, 2013, 9 pp.
International Preliminary Report on Patentability from International Application No. PCT/US2012/057232, dated Jan. 21, 2014, 12 pp.

METHODS AND APPARATUS FOR CONDITIONAL DISPLAY OF A STEREOSCOPIC IMAGE PAIR

CROSS REFERENCE TO RELATED APPLICATIONS

This application is a continuation of U.S. patent application Ser. No. 13/249,028, filed Sep. 29, 2011. The content of this prior application is considered part of this application, and is hereby incorporated by reference in its entirety.

TECHNICAL FIELD

The present embodiments relate to imaging devices, and in particular, to methods, apparatus, and systems for the capture of stereoscopic images.

BACKGROUND

In the past decade, digital imaging capabilities have been integrated into a wide range of devices, including digital cameras and mobile phones. Recently, the ability to capture stereoscopic images with these devices has become technically possible. Device manufacturers have responded by introducing devices integrating multiple digital imaging sensors. A wide range of electronic devices, including mobile wireless communication devices, personal digital assistants (PDAs), personal music systems, digital cameras, digital recording devices, video conferencing systems, and the like, make use of multiple imaging sensors to provide a variety of capabilities and features to their users. These include not only stereoscopic (3D) imaging applications such as 3D photos and videos or movies, but also higher dynamic range imaging and panoramic imaging.

To achieve stereoscopic image pairs that are precisely aligned, devices with a plurality of imaging sensors are often calibrated during the manufacturing process. The device may be placed into a special "calibration mode" on the manufacturing line, with the imaging sensors pointed at a target image designed to assist in clearly identifying each camera's relative position. Each camera of the device may then be focused on the target image and an image captured. Each captured image can then be analyzed to extract the camera's relative orientation.

Some cameras may be designed such that small adjustments to each camera's relative position can be made on the factory floor to better align the positions of the two cameras. For example, each camera may be mounted within an adjustable platform that provides the ability to make small adjustments to its position. Alternatively, the images captured by each camera may be analyzed by image processing software to determine the relative position of each camera to the other. This relative position data is then stored in a nonvolatile memory on the camera. When the product is later purchased and used, on board image processing utilizes the relative position information to electronically adjust the images captured by each camera to produce high quality stereoscopic images.

These calibration processes have several disadvantages. First, a precise manufacturing calibration consumes time during the manufacturing process, increasing the cost of the device. Second, any calibration data produced during manufacturing is static in nature. As such, it cannot account for changes in camera position as the device is used during its life. For example, the calibration of the multiple lenses may be very precise when the camera is sold, but the camera may be dropped soon after purchase. The shock of the fall may cause the cameras to go out of calibration. Despite this, the user will likely expect the camera to survive the fall and continue to produce high quality stereoscopic images.

Furthermore, expansion and contraction of camera parts with temperature variation may introduce slight changes in the relative position of each camera. Factory calibrations are typically taken at room temperature, with no compensation for variations in lens position with temperature. Therefore, if stereoscopic imaging features are utilized on a particularly cold or hot day, the quality of the stereoscopic image pairs produced by the camera may be affected.

Therefore, a static, factory calibration of a multi camera device has its limits. While a periodic calibration would alleviate some of these issues, it may not be realistic to expect a user to perform periodic stereoscopic camera calibration of their camera during its lifetime. Many users have neither the desire nor often the technical skill to successfully complete a calibration procedure.

SUMMARY

Some of the present embodiments may comprise a method of displaying a stereoscopic image pair. The method may comprise receiving a first image from an input device and receiving a second image from an input device. The method may further comprise determining a vertical disparity between the first image and the second image, and displaying a stereoscopic image pair if a vertical disparity is below a threshold. The method may further comprise correcting the vertical disparity between the first image and the second image by generating at least one corrected image, and generating the stereoscopic image pair based on the corrected image. In some aspects, the vertical disparity is determined by receiving meta information from an input device. In some other aspects, the method further comprises displaying exception information when the vertical disparity is above a threshold. In some aspects, the exception information includes a low quality indicator. In some other aspects, the exception information includes a prompt asking whether to continue stereoscopic imaging. In some other aspects, exception information is a two dimensional image. In some aspects, the method further comprises displaying field of view exception information when the field of view of the stereoscopic image is below a second threshold. In some aspects, the field of view exception information is a reduced field of view indicator.

In some aspects, determining the vertical disparity comprises generating a first row sum vector for the first image, generating a second row sum vector for the second image, and determining a best fit for the first row sum vector and the second row sum vector. In some other aspects, determining the vertical disparity comprises generating a first row edge sum vector for the first image, generating a second row edge sum vector for the second image, and determining a best fit for the first row edge sum vector and the second row edge sum vector. In some aspects, the best fit is determined by the minimum sum of difference values.

In some aspects, the method further comprises storing the stereoscopic image pair to a data store. In some aspects, correcting the vertical disparity includes shifting or cropping the first image or the second image.

Other aspects relate to an image processing device, comprising a processor, an input device, a master control module configured to receive a first image from the input device and receive a second image from the input device, a disparity determination module configured to determine a vertical disparity between the first image and the second image, and a display control module configured to display a stereoscopic image pair on an electronic display when the vertical disparity is below a threshold. In some aspects, the device further comprises a shift and crop module, configured to correct the vertical disparity between the first image and the second image by generating at least one corrected image, and an encoding module, configured to generate the stereoscopic image pair based on the corrected image. In some aspects, the display control module is further configured to display exception information when the vertical disparity is above a threshold. In some other aspects, the vertical disparity is determined by receiving meta information from an input device. In some aspects, the exception information is a prompt asking whether to continue stereoscopic imaging when the vertical disparity is above a threshold. In some aspects, the exception information is a two dimensional image when the vertical disparity is above a threshold. In some aspects, the display control module is further configured to display field of view exception information when the field of view of the stereoscopic image is below the second threshold. In some aspects, the field of view exception information is a reduced field of view indicator.

In some aspects, the device further comprises a data store, wherein the master control module is further configured to store the stereoscopic image pair to the data store. In some aspects, the device further comprises an electronic display, wherein the display control module is configured to display the stereoscopic image pair on the electronic display. In some aspects, the disparity determination module determines the vertical disparity by generating a first row sum vector for the first image, generating a second row sum vector for the second image, and determining a best fit for the first row sum vector and the second row sum vector. In some aspects, the disparity determination module determines the vertical disparity by generating a first row edge sum vector for the first image, generating a second row edge sum vector for the second image, and determining a best fit for the first row edge sum vector and the second row edge sum vector. In some aspects, the best fit is determined by minimizing the sum of absolute difference values between two vectors. In some other aspects, the disparity determination module determines the vertical disparity by receiving meta-information from the input device. In some aspects, the image processing device is a wireless telephone.

Some aspects include a non-transitory computer readable medium containing processor executable instructions that when executed perform a method of receiving a first image from an input device, receiving a second image from an input device, determining a vertical disparity between the first image and the second image, and displaying a stereoscopic image pair on an electronic display when the vertical disparity is below a threshold. In some aspects, the computer readable medium further includes instructions that when executed perform a method of displaying exception information when the vertical disparity is above the threshold. In some aspects, the vertical disparity is determined by receiving meta information from an input device. In some aspects exception information is a prompt asking whether to continue stereoscopic imaging when the vertical disparity is above a threshold.

Some aspects relate to an imaging device comprising means for receiving a first image from an input device, means for receiving a second image from an input device, means for determining a vertical disparity between the first image and the second image, and means for displaying a stereoscopic image pair on an electronic display when the vertical disparity is below a threshold. In some aspects, the imaging device further comprises means for correcting the vertical disparity between the first image and the second image by generating at least one corrected image, and means for generating the stereoscopic image pair based on the corrected image. In some aspects the device comprises a wireless telephone handset. In some aspects, the means to determine a vertical disparity includes instructions that configure a processor to perform a best fit of row sum vectors. In some aspects, the means to determine a vertical disparity includes instructions that configure a processor to perform a best fit of row edge sum vectors.

Other present embodiments may include an imaging device including a first imaging sensor and a second imaging sensor, and an electronic processor configured to control the imaging sensors. These embodiments may also include a control module configured to capture a first image using the first imaging sensor, capture a second image using the second imaging sensor, determine the vertical disparity between the first image and the second image, and apply a correction to create at least one corrected image.

In some embodiments determining the vertical disparity may comprise generating a first row sum vector for the first image, generating a second row sum vector for the second image, and determining a best fit for the first row sum vector and the second row sum vector. In other embodiments, determining the vertical disparity may comprise generating a first row edge sum vector for the first image, generating a second row edge sum vector for the second image, and determining a best fit for the first row edge sum vector and the second row edge sum vector. In some embodiments, the best fit may be determined by minimizing the sum of absolute difference values between the two vectors.

In some embodiments, the method may further comprise creation of a stereoscopic image pair based on the corrected image. In some embodiments, the elements may be performed repetitively, for example, each stereoscopic image pair may be part of a stereoscopic video or movie. Alternatively, the stereoscopic image pair may comprise a snapshot. In other embodiments, the imaging device may further comprise a wireless telephone handset. Some embodiments of the device further comprise a user actuated control, wherein the control module is further configured to capture the first image in response to a first actuation of the user actuated control.

Other present embodiments may include a non-transitory computer readable medium containing processor executable instructions that are operative to cause a processor to determine a vertical disparity between a first image and a second image, correct the vertical disparity by generating at least one corrected image, and generate a stereoscopic image pair based on the corrected image. In some embodiments, instructions may cause a processor to determine a vertical disparity by generating a first row edge sum vector for the first image, generating a second row edge sum vector for the second image, and determining a best fit for the first row edge sum vector and the second row edge sum vector. In other embodiments, instructions may cause a processor to determine a vertical disparity by generating a row sum vector for the first image, generating a second row sum vector for the second image, and determining a best fit between the first row edge sum vector and the second row edge sum vector. In some embodiments, determining a best fit includes minimizing the sum of absolute differences between two vectors.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1A:
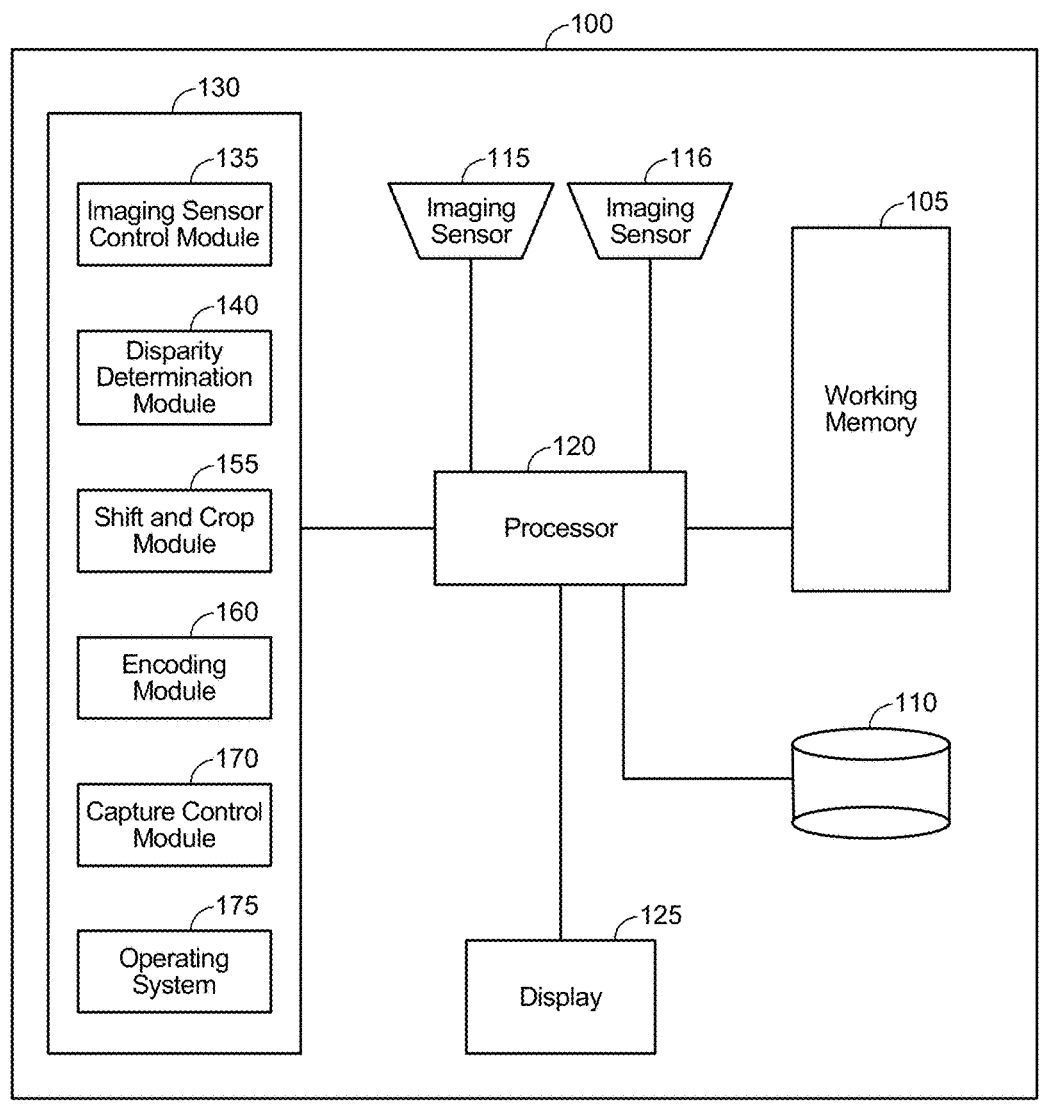
FIG. 1A is a block diagram depicting a device implementing some operative embodiments. The major components of a mobile device are illustrated.

Implementations disclosed herein provide systems, methods and apparatus for generating a stereoscopic image with a device including multiple imaging sensors. Particularly, the present embodiments contemplate determining a vertical disparity between two images, correcting the vertical disparity by generating at least one corrected image, and generating and displaying a stereoscopic image pair based on the corrected image. One skilled in the art will recognize that these embodiments may be implemented in hardware, software, firmware, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The relative positions of the multiple cameras of a stereoscopic imaging device can be described by three axis of angular movement and three axis of shift. For purposes of this discussion, positions on a x, y, and z axis describe relative shift. Angular rotational can be described by rotations about a horizontal (x) axis, also called "pitch", vertical y axis, known as "yaw", and "z" axis or "roll."

Variations in the relative position of multiple sensors across some axis effect stereoscopic image quality more significantly than others. For example, psychophysical tests confirm that shift along the y axis or a variation in pitch angle have the greatest effect on perceived image quality. These shifts along the y axis or pitch angle are known as vertical disparity. Vertical disparity may cause nausea and headaches when viewed over a prolonged period, as is the case for example, in stereoscopic video or movie applications.

Given the sensitivity of stereoscopic image pair quality to vertical disparity, and the relative difficulty of maintaining a multi imaging sensor device in a state of precise calibration, it becomes advantageous to provide an imaging device with some degree of tolerance to captured image pairs with vertical disparity. One embodiment is an image processing method that dynamically adjusts stereoscopic image pairs to reduce or eliminate the vertical disparity between the images. By dynamically adjusting images to remove or reduce vertical disparity, the quality of stereoscopic image pairs is less dependent on a precise device calibration. This is especially advantageous as it is often difficult to achieve such calibrations in real world application of the devices.

FIG. 1A depicts a high-level block diagram of a device 100 having a set of components including a processor 120 linked to imaging sensors 115 and 116. A working memory 105, storage 110, electronic display 125, and memory 130 are also in communication with the processor 120.

Device 100 may be a cell phone, digital camera, personal digital assistant, tablet computer or the like. Device 100 may also be a more stationary device such as a desktop personal computer, video conferencing station, or the like. A plurality of applications may be available to the user on device 100. These applications may include traditional photographic applications, high dynamic range imaging, panoramic video, or stereoscopic imaging that produce 3D images or 3D video.

Processor 120 may be a general purpose processing unit or a processor specially designed for imaging applications. As shown, the processor 120 is connected to a memory 130 and a working memory 105. In the illustrated embodiment, the memory 130 stores an imaging sensor control module 135, disparity determination module 140, shift and crop module 155, encoding module 160, capture control module 170, and operating system 175. These modules include instructions that configure the processor to perform various image processing and device management tasks. Working memory 105 may be used by processor 120 to store a working set of processor instructions contained in the modules of memory 130. Alternatively, working memory 105 may also be used by processor 120 to store dynamic data created during the operation of device 100.

As mentioned above, the processor is configured by several modules stored in the memories. The imaging sensor control module 135 includes instructions that configure the processor 120 to adjust the focus position of imaging sensors 115 and 116. The imaging sensor control module 135 also includes instructions that configure the processor 120 to capture images with imaging sensors 115 and 116. Therefore, processor 120, along with image capture control module 135, imaging sensor 115 or 116, and working memory 105 represent one means for capturing an image using an imaging sensor. Since an imaging sensor can be considered an input device, processor 120, along with image capture control module 135, imaging sensors 115 or 116, and working memory 105 also represent one means for capturing an image with an input device.

The disparity determination module 140 provides instructions that configure the processor 120 to determine and possibly eliminate vertical disparity between two images captured by imaging sensors 115 and 116. Therefore, instructions within the disparity determination module, along with processor 120 and working memory 105 represent one means for determining a vertical disparity between a first image and a second image.

Shift and crop module 155 include instructions that may configure the processor 120 to shift a first image and a second image in relation to each other in order to correct for vertical disparity between the two images. Shift and crop module 155 may also include instructions to crop image 1 and/or image 2 to achieve consistent alignment between the two images. Therefore, instructions included in a shift and crop module 155, along with processor 120 and memory 105 represent one means for correcting the vertical disparity between two images.

Encoding module 160 includes instructions that configure the processor to encode images captured by imaging sensor 115 and 116 into a stereoscopic image. Therefore, instructions contained within encoding module 160 represent one means for generating a stereoscopic image based on a first image and a second image.

Capture control module 170 may include instructions that control the overall image processing functions of device 100. For example, capture control module 170 may include instructions that call subroutines in imaging control module 135 in order to configure the processor 120 to capture a first and second image using the imaging sensors 115 or 116. Capture control module 170 may then call disparity determination module 140 to determine the vertical disparity between the two images. Capture control module may then call shift and crop module 155 to shift and crop images captured by imaging sensor 115 or imaging sensor 116 to vertically align the images. Capture control module 170 may then call encoding module 160 to encode the two images captured by imaging sensor 115 and imaging sensor 116, and adjusted by the shift and crop module 160 into a stereoscopic image pair. In some embodiments, encoding module 160 or capture control module 170 may include instructions which configure the processor 120 to store a stereoscopic image pair to the data store 110.

In some other embodiments, capture control module 170 may include instructions that configure the processor to display data on display 125. Therefore, instructions within a capture control module, a processor such as processor 120, and a memory, such as working memory 105 represent one means for displaying data on an electronic display.

Operating system module 175 configures the processor to manage the memory and processing resources of device 100. For example, operating system module 175 may include device drivers to manage hardware resources such as the electronic display 125, storage 110, or imaging sensor 115. Therefore, in some embodiments, instructions contained in the image processing modules discussed above may not interact with these hardware resources directly, but instead interact through standard subroutines or APIs located in operating system component 175. Instructions within operating system 175 may then interact directly with these hardware components.

For example, operating system 175 may include a set of instructions that form a display device driver. These instructions may configure processor 120 to cause data to be displayed on display 125. The instructions contained in an operating system display device driver may control an electronic display so as to enable other modules stored in the memories, such as memory 130 to more easily display data on an electronic display. Therefore, instructions contained in operating system 175 that configure the processor to display data on an electronic display, along with the electronic display 125 and processor 120 represent one means for displaying data on an electronic display.

Processor 120 may write data to storage module 110. While storage module 110 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

Although FIG. 1A depicts a device having separate components that include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 1A illustrates two memory components, to include memory component 130 having several modules, and a separate memory 105 having a working memory, one with skill in the art would recognize several embodiments utilizing different memory architectures. For example, a design may utilize ROM or static RAM memory for the storage of processor instructions implementing the modules contained in memory 130. Alternatively, processor instructions may be read at system startup from a disk storage device that is integrated into device 100 or connected via an external device port. The processor instructions may then be loaded into RAM to facilitate execution by the processor. For example, working memory 105 may be a RAM memory, with instructions loaded into working memory 105 before execution by the processor 120.

Figure 1B:
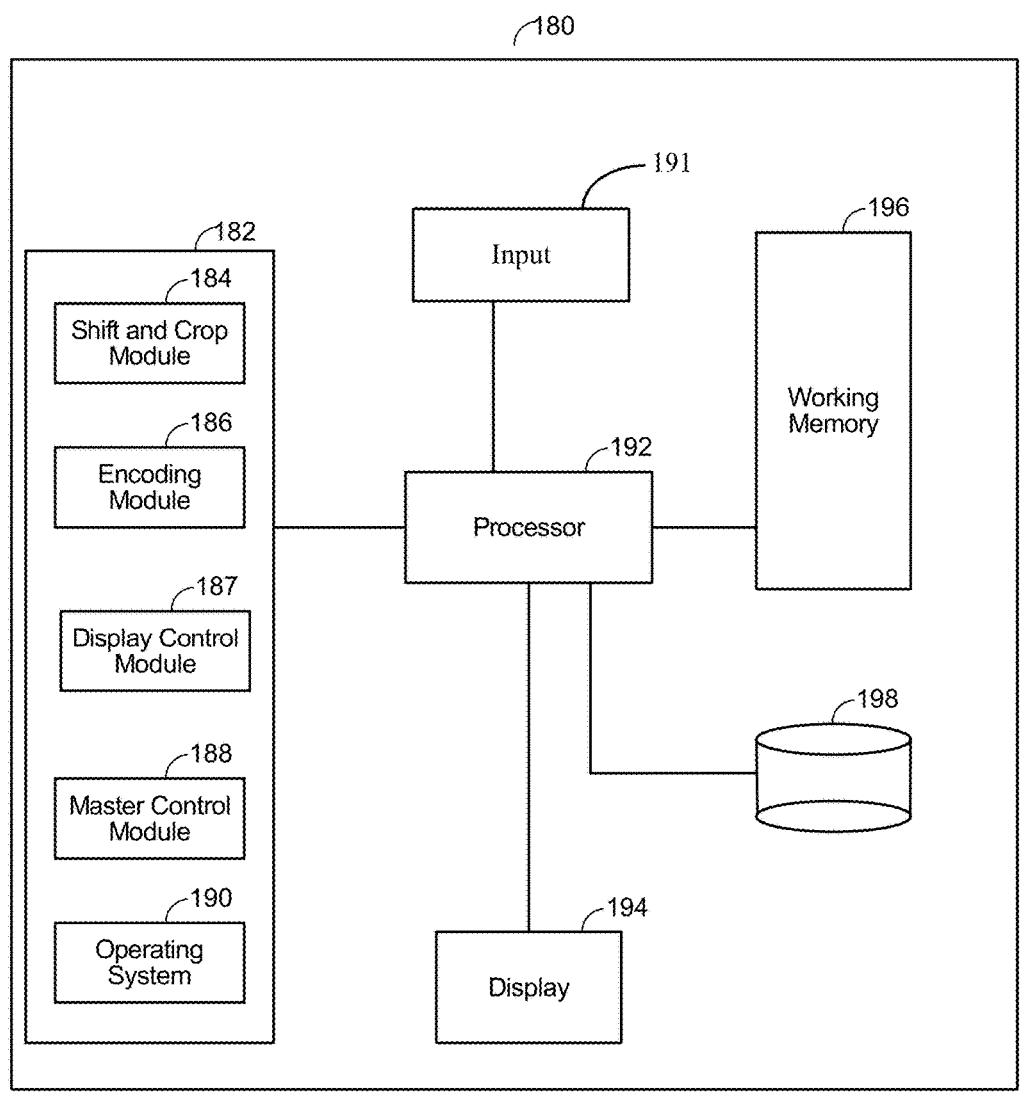
FIG. 1B is a block diagram depicting one embodiment of a device that generates stereoscopic images.

FIG. 1B depicts a block diagram of a device 180 having a set of components including a processor 192, and a working memory 196, storage 198, electronic display 194, and memory 182 in communication with the processor 192.

Device 180 may be a cell phone, digital camera, personal digital assistant, tablet computer or the like. Device 180 may also be a more stationary device such as a desktop personal computer, video conferencing station, or the like. A plurality of applications may be available to the user on device 180. These applications may include traditional photographic applications, high dynamic range imaging, panoramic video, or stereoscopic imaging that produce 3D images or 3D video.

Processor 192 may be a general purpose processing unit or a processor specially designed for imaging applications.

As shown, the processor 192 is connected to an input 191, memory 182 and a working memory 196. Input 191 provides data to processor 192. Depending on the particular embodiment, data provided from input 191 may come from a variety of sources. For example, in one embodiment, input 191 may represent a network adaptor. Input 191 may establish network connectivity with data sources over the network and provide the data received from those data sources to processor 192. Alternatively, in other embodiments, input 191 may represent a portable media reader device such as a USB flash drive, CD-ROM drive, Floppy Disk Drive, or the like. Input 191 may read the data from the portable media and provide it to processor 192. Input 191 may also represent a traditional fixed storage device such as a tape drive, hard disk, RAM drive, or the like.

Instructions within master control module 188 may include instructions that configure the processor 912 to receive data from input 191. For example, some embodiments may include instructions that configure processor 192 to receive a first or second image from input 191. Some embodiments may include a master control module that includes instructions that configure the processor to also receive vertical disparity meta-information from input 190. Therefore, instructions within a master control module that configure the processor to read data from input 191, along with processor 192, input 191, and working memory 196 may represent one means for determining a vertical disparity between the first image and the second image. Instructions within one embodiment of a master control module that configure the processor to read image data from input 191, along with processor 192, input 191, and working memory 196 may represent one means for receiving an image from an input device.

In the illustrated embodiment, memory 182 includes a shift and crop module 184, encoding module 186, display control module 187, master control module 188, and operating system 190. These modules include instructions that configure the processor to perform various image processing and device management tasks. Working memory 196 may be used by processor 192 to store a working set of processor instructions contained in the modules of memory 182. Alternatively, working memory 196 may also be used by processor 192 to store dynamic data created during the operation of device 180.

As mentioned above, the processor is configured by several modules stored in the memories. Shift and crop module 184 includes instructions that may configure the processor 192 to shift a first image and a second image in relation to each other in order to correct for vertical disparity between the two images. Shift and crop module 184 may also include instructions to crop the first image and/or the second image to achieve consistent alignment between the two images. Therefore, instructions within shift and crop module 184, along with processor 192 and working memory 196 may represent one means for correcting the vertical disparity between two images by generating at least one corrected image.

Encoding module 186 may include instructions that configure the processor to encode a first and second image into a stereoscopic image. Master control module 188 may provide a corrected image from shift and crop module 184 to encoding module 186. Encoding module 186 may then create a stereoscopic image pair based on the corrected image. Therefore, instructions contained within encoding module 186 represent one means for generating a stereoscopic image based on a image, including a corrected image.

Display control module 187 may include instructions that configure the processor to display data on an electronic display. Therefore, instructions contained within display control module 187, along with processor 192 and memory 182 represent one means for displaying data on an electronic display. Since encoding module 186 may encode a stereoscopic image pair, and master control module 188 may pass the encoded stereoscopic image pair to display control module 187, upon which instructions in display control module 187 may cause the stereoscopic image to be displayed on a display such as display 194, instructions within the display control module 187, along with processor 192 and memory 182 represent one means for displaying a stereoscopic image pair on an electronic display.

Master control module 188 may include instructions that control the overall image processing functions of device 180. For example, master control module 188 may include instructions that configure the processor 192 to receive two image frames from input 191. Master control module may also include instructions that configure processor 192 to receive meta data from input 191 that indicates a vertical disparity between two image frames. Master control module 188 may then call shift and crop module 184 to shift and crop images received from input 191 to vertically align the images. Master control module 188 may then call encoding module 186 to encode the two images after they have been processed by shift and crop module 184 into a stereoscopic image pair. In some embodiments, encoding module 186 or master control module 188 may include instructions that configure the processor 192 to store a stereoscopic image pair to the data store 198. Master control module 188 may also call display control module 187 to display data on an electronic display, such as display 194.

Operating system module 190 configures the processor 192 to manage the memory and processing resources of device 180. For example, operating system module 190 may include device drivers to manage hardware resources such as the input 191, electronic display 194, or storage 198. Therefore, in some embodiments, instructions contained in the image processing modules discussed above may not interact with these hardware resources directly, but instead interact through standard subroutines or APIs located in operating system component 190. Instructions within operating system 190 may then interact directly with these hardware components.

Processor 192 may write data to storage module 198. While storage module 198 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

Although FIG. 1B depicts a device having separate components that include a processor and memory, one skilled in the art would recognize that these separate components may be combined in a variety of ways to achieve particular design objectives. For example, in an alternative embodiment, the memory components may be combined with processor components to save cost and improve performance.

Additionally, although FIG. 1B illustrates two memory components, to include memory component 182 having several modules, and a separate memory 196 having a working memory, one with skill in the art would recognize several embodiments utilizing different memory architectures. For example, a design may utilize ROM or static RAM memory for the storage of processor instructions implementing the modules contained in memory 182. Alternatively, processor instructions may be read at system startup from a disk storage device that is integrated into device 180 or connected via an external device port. The processor instructions may then be loaded into RAM to facilitate execution by the processor. For example, working memory 196 may be a RAM memory, with instructions loaded into working memory 105 before execution by the processor 192.

Although FIG. 1B has been illustrated to include an input device 190 and device 100 of FIG. 1A does not include an input device, it is understood that other embodiments of an imaging device may include a variety of components illustrated in both FIGS. 1A and 1B. For example, one embodiment may include both imaging sensors 115 and 116 and input device 190. In this embodiment, images may be received from the image sensors while meta information indicating the disparity between the images may be received via input 191. Alternatively, some image pairs may be received via image sensors while other image pairs are received via an input device. One embodiment of a device may determine the disparity between two images using different methods depending on the source of the images. For example, one embodiment may determine vertical disparity of images captured with embedded image sensors using row summing or row edge summing methods, while the vertical disparity of images received via a separate input device, such as input device 191, may be determined via meta information received via input device 191.

Figure 2A:
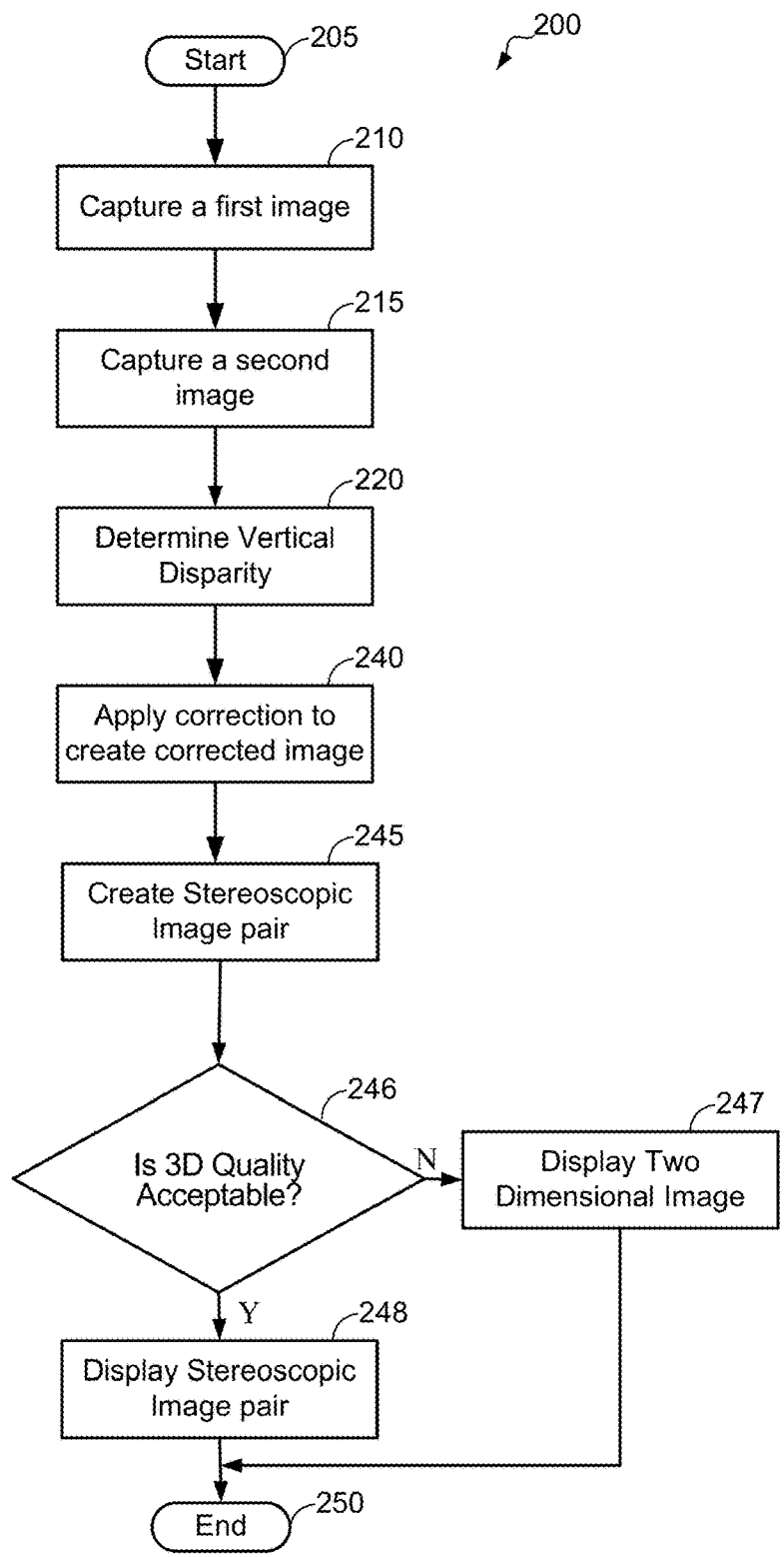
FIG. 2A is a flow chart of one embodiment of a process for displaying a stereoscopic image pair on an electronic display.

FIG. 2A is a flow chart of a process for displaying data on an electronic display. Portions or all of process 200 of FIG. 2A may be implemented in one embodiment by instructions included in the capture control module 170 of FIG. 1A. The process 200 begins at a start block 205 and then transitions to block 210 where a first image is captured. The first image may be captured by instructions in capture control module 170 calling subroutines inside imaging sensor control module 135. Imaging sensor control module 135 may then configure the processor to control imaging sensor 115 or 116, possibly via operating system module 175, to capture an image. Process 200 then moves to block 215 wherein a second image is captured. Process 200 then moves to block 220 where instructions determine the vertical disparity between the captured first and second images. These instructions may be located in the disparity determination module 140 of FIG. 1A. Alternatively, block 220 may be implemented by instructions in the master control module 188 that includes instructions to configure a processor, such as processor 192, to read data from an input device, such as the input device 191 of FIG. 1B.

Figures 3A, 3B:
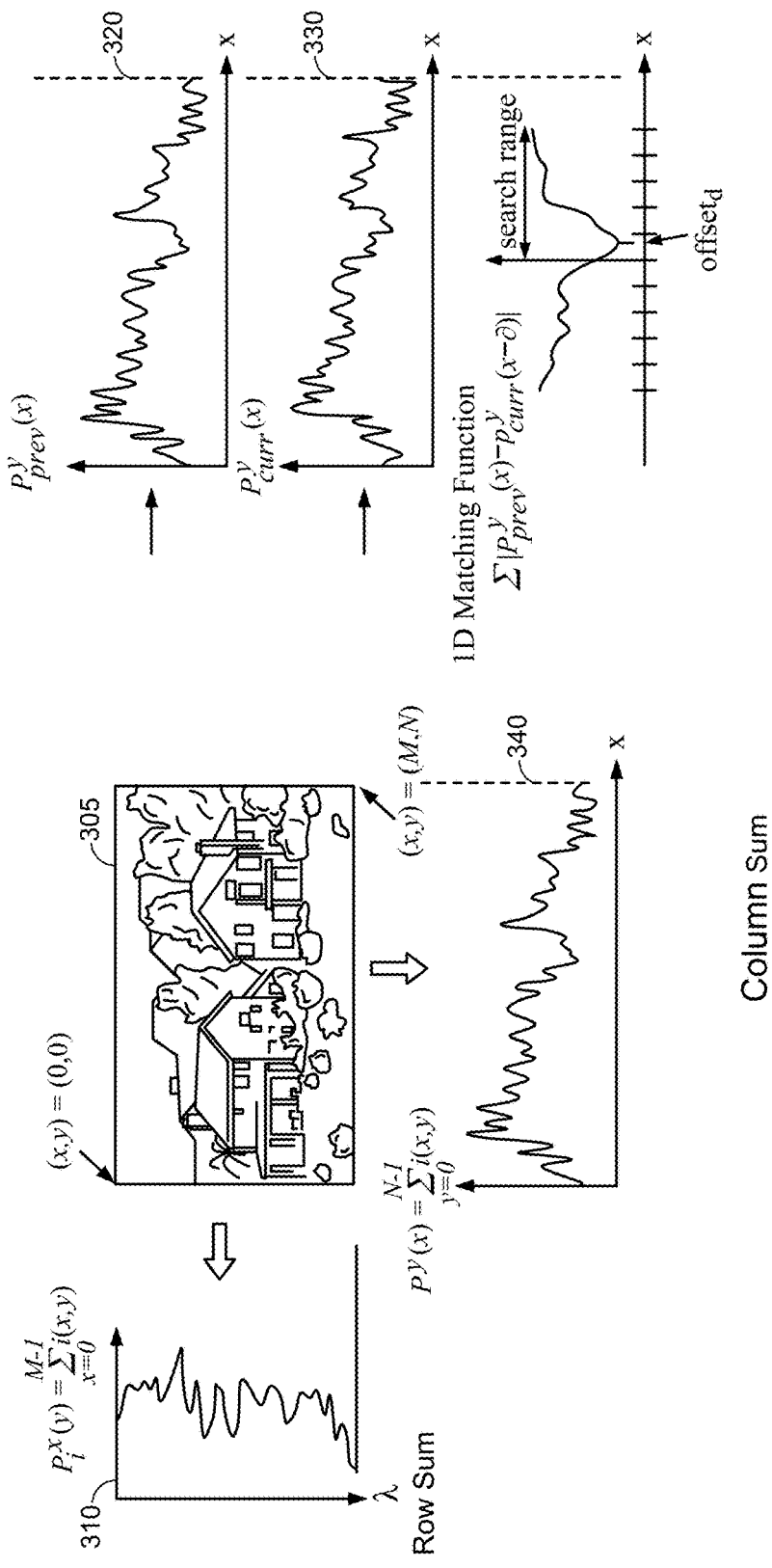
FIG. 3A illustrates a process of image row summation and the creation of a row sum vectors in at least one operative embodiment.
FIG. 3B illustrates a process of a best fit operation being performed between two row sum vectors in at least one operative embodiment.

In the illustrated embodiment, block 220 of process 200 may include instructions that determine the vertical disparity between the first and second images by first summing the rows of each image. This summation process creates two vectors, one vector for each image. Each element of a vector represents one row sum for an image. An example vector is shown in FIG. 3A, item 310. The rows of the image 305 in FIG. 3A have been summarized, producing a vector represented by the graph 310. Note that the sum of each row will create a discontinuous graph, but the graph is shown as a continuous line for illustration purposes. Row sums for two images are illustrated in FIG. 3A. Image 320 is taken from one sensor and image 330 is taken from another sensor. Differences in the two graphs represent variation between the two images.

The vectors have substantial similarities. For example there is a general correspondence between the peaks and valleys of the two graphs. These similarities allow a best fit operation to be performed on the two vectors. In some embodiments, a best fit may be determined by identifying an offset between the two vectors that minimizes the sum of absolute differences between positions of the two vectors.

Therefore, instructions within the vertical disparity determination module 140, performing a best fit of row sum vectors, along with a processor and memory represents one means for determining the vertical disparity between two images.

While row summing provides one solution to disparity recognition and adjustment, it has some disadvantages. For example, its effectiveness is scene dependent, and it may fail completely in some cases. Additionally, its precision can be affected when there is misalignment between the two images, for example, a misalignment in pitch can effect the accuracy of a row summing based solution. Image misalignment due to scaling (one sensor closer to a scene than another sensor) can also effect the accuracy of a vertical disparity determination based on row summing.

Because of these disadvantages with the row summing technique, other embodiments may form vectors based on the results of a horizontal edge detection process. Each pixel of an image may be assigned an edge value based on an edge detection process. The edge values for each pixel in a row of the image may be summed and the results stored in a corresponding entry of a horizontal edge vector. This process is repeated for every row of the image, with the results of each row summation stored in a corresponding entry in the horizontal edge vector. For two images, two horizontal edge vectors are used.

A best fit may then be performed on the horizontal edge vectors in a similar manner as that described above. For example, the best fit of the two vectors may be determined by identifying an offset between the two vectors that minimizes the sum of the absolute differences between corresponding entries in the two vectors. By shifting one image by the size and direction indicated by the offset, the images may be aligned vertically. Alternatively, since the offset indicates the total amount of vertical shift needed to align the images, both images may be shifted by half the amount indicated by the offset. Therefore, instructions within vertical disparity determination module 140 performing a best fit of horizontal edge vectors along with a processor and memory represents another means for determining the vertical disparity between two images.

Returning to FIG. 2A, other embodiments of block 220 may determine vertical disparity using alternate methods. For example, some embodiments may identify a best match within a local neighborhood of the two images. For example, an embodiment may locate key feature points within one image and search for the best match in the other image. Therefore, instructions within vertical disparity determination module 140 performing a best match within a local neighborhood for a key feature point, along with a processor and memory represent another means for determining the vertical disparity between two images.

Other embodiments may determine vertical disparity based on meta-information received from an input device, for example the input device 190 illustrated in FIG. 1B. For example, a device such as device 180 illustrated in FIG. 1B may receive two images forming a stereoscopic image pair via input device 190. These images may be provided by an external source. For example, the external source may be another device, such as an image processing computer. This image processing computer may also determine the vertical disparity between the two images. The vertical disparity information may then be sent to device 180 as meta information that is received via input device 191. Therefore, instructions in master control module that configure a processor to receive meta-information from an input device represent another means for determining the vertical disparity between two images.

After the vertical disparity has been determined, process 200 moves to block 240, where a correction is applied to one or both of the images. Block 240 may be performed by instructions contained in any one or combination of the disparity determination module 140, shift and crop module 155, or the capture control module 170 of device 100, illustrated in FIG. 1A. Instructions in these modules along with a processor and memory represent one means for applying a correction to create a corrected image.

To correct for any vertical disparity, block 240 may shift and/or crop one or both images. For example, the first image may be cropped to remove disparity with respect to the second image. However, because the first image is now smaller in the cropped dimension, the second image may also need to be cropped to maintain dimensions equivalent to the first image. This cropping results in a stereoscopic image pair with a smaller vertical field of view than that of the original images. However, eliminating vertical disparity may require the removal of only five percent of image height on the bottom and top of the image to produce a vertically aligned stereoscopic image pair. This may reduce the vertical field of view by a total of ten percent. Instructions contained in a shift and crop module 155 that perform cropping of one or both images as described above represent another means for applying a correction to create a corrected image.

Once the appropriate corrections have been applied, process 200 moves to block 245 where a stereoscopic image pair is generated based on any corrected images. In one embodiment, block 245 may be performed by instructions in encoding module 160. Therefore, instructions in encoding module 160 represent one means for generating a stereoscopic image pair. The original first and second images may also be used.

Process 200 then transitions to decision block 246 which determines whether the stereoscopic image pair created in block 245 is of an acceptable quality level. Block 246 may be implemented by instructions in capture control module 170 of FIG. 1A or master control module 188 of FIG. 1B. The quality level of a stereoscopic image pair may be determined in some embodiments by the amount of vertical disparity remaining between the two images included in the stereoscopic image pair. If the quality of the stereoscopic image pair is acceptable, process 200 transitions to block 248, where the stereoscopic image pair is displayed. If the quality level of the stereoscopic image pair is not acceptable, process 200 moves from decision block 246 to processing block 247 where a two dimensional version of the stereoscopic image pair is displayed. For example, block 247 may display only one of the two images included in the stereoscopic image pair. Process 200 then transitions to end state 250.

Figure 2B:
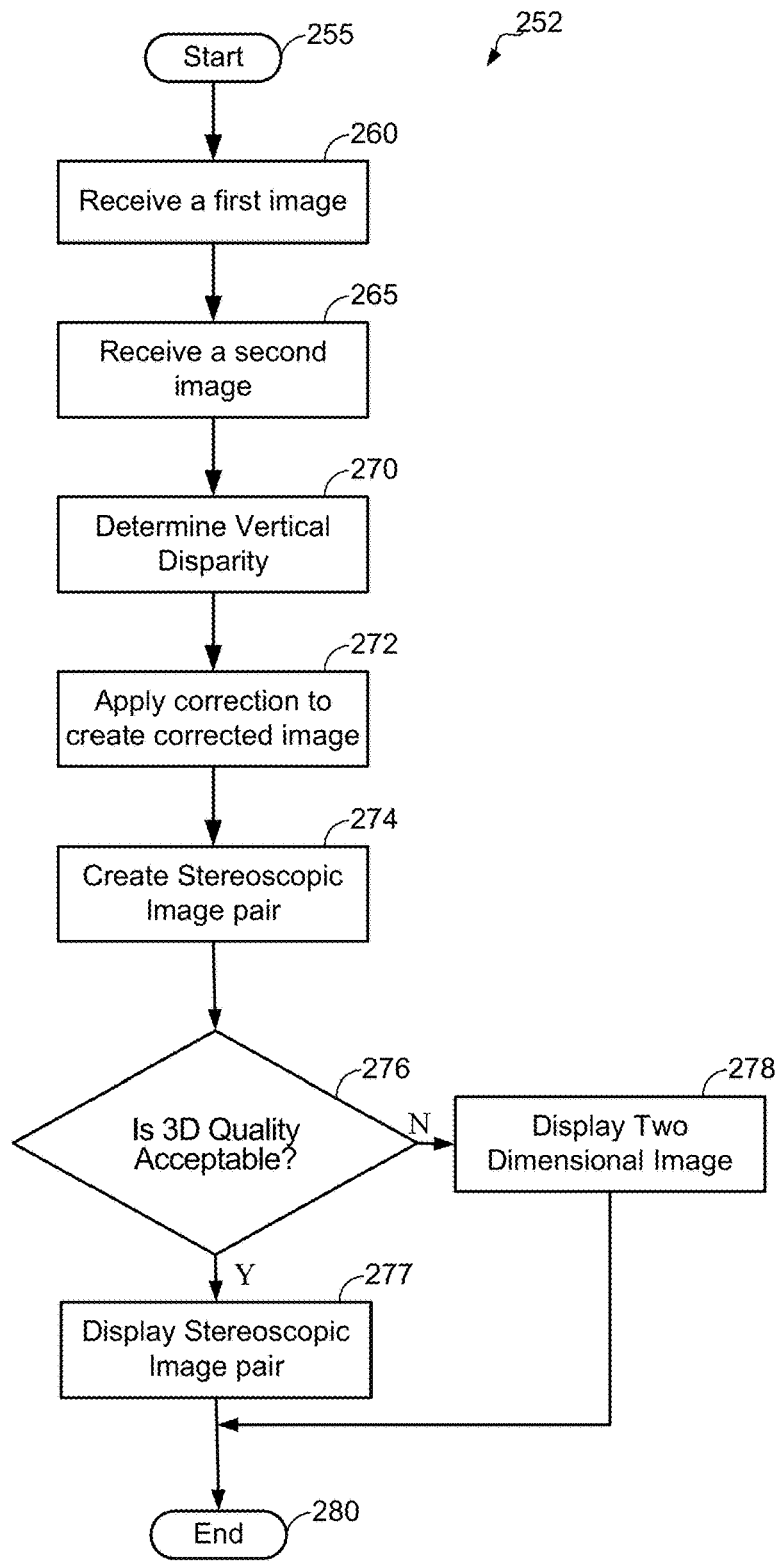
FIG. 2B is a flow chart of an embodiment of a process for displaying stereoscopic image data on an electronic display.

FIG. 2B is a flow chart of a process for displaying data on an electronic display. Portions or all of process 252 of FIG. 2B may be implemented in one embodiment by instructions included in the capture control module 170 of FIG. 1A or the master control module 188 of FIG. 1B. Process 252 starts at start block 255 and then moves to block 260 where a first image is received. The first image may be received in some embodiments from image sensors 115 or 116 of FIG. 1A. Alternatively, the image may be received from input 191 of FIG. 1B. After the first image is received in block 260, process 252 moves to block 265 where a second image is received. Similar to the first image, the second image may be received from an image sensor 115 or 116 of FIG. 1A or an input 191 of FIG. 1B. Process 252 then moves to block 270 where the vertical disparity between the two images received in blocks 260 and 265 is determined. Block 270 may function similarly to block 220 as described above with respect to FIG. 2A. Process 252 then moves to block 272 where the vertical disparity determined in block 270 is used to apply a correction to create at least one corrected image. Correcting the first or the second image may include shifting or cropping one or both of the images. Block 272 may be performed in the shift and crop module 160 of device 100, illustrated in FIG. 1A, or the shift and crop module 184 of device 180, illustrated in FIG. 1B. Process 252 then moves to block 274, where a stereoscopic image pair is created. The stereoscopic image pair created in block 274 may be based on corrected image or images from block 272.

After the stereoscopic image pair has been created, process 252 then moves to decision block 276, where the quality of the stereoscopic image pair created in block 274 is compared to a quality threshold. If the quality of the stereoscopic image pair is above the quality threshold, block 276 will determine the quality of the stereoscopic image pair is acceptable.

Block 276 may evaluate one or more attributes of the stereoscopic image pair before determining to determine if the quality of the stereoscopic image pair is above a quality threshold. For example, block 276 may evaluate the vertical disparity remaining between the images of the stereoscopic image pair. If the vertical disparity is above a threshold, block 276 may determine that the quality of the stereoscopic image pair is lower than a quality threshold. Block 276 may also evaluate the field of view of the stereoscopic image pair. If the field of view has been reduced below a field of view threshold, block 276 may determine that the quality level of stereoscopic image pair is below a quality threshold. Block 276 may also evaluate the results of both the vertical disparity and field of view determinations to determine the quality level of the stereoscopic image pair.

If block 276 determines that the quality of the stereoscopic image pair is acceptable, process 252 transitions to block 277 where the stereoscopic image pair is displayed. For example, the image pair may be displayed on display 125 of device 100, illustrated in FIG. 1A or display 194 of device 180, illustrated in FIG. 1B. If however the quality level of the stereoscopic image pair is below a threshold level that is considered acceptable quality, process 252 moves to block 278 where a two dimensional image may be displayed. The two dimensional image displayed in block 278 may also be displayed on display 125 of device 100 or display 194 of device 180 in some embodiments. After an image is displayed in either block 277 or 278, process 252 moves to end block 280.

Figure 2C:
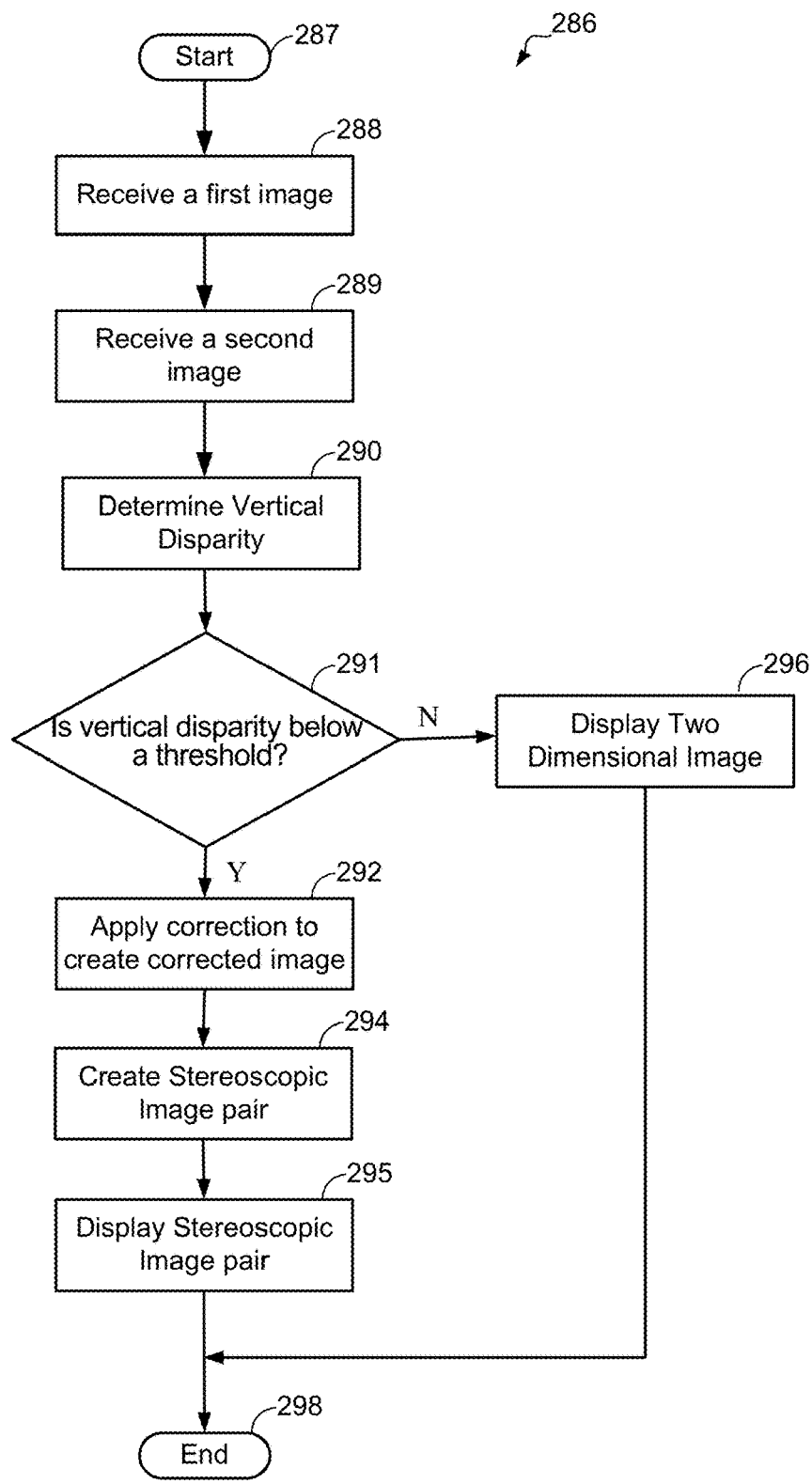
FIG. 2C is a flow chart of an embodiment of a process for displaying stereoscopic image pair data on an electronic display.

FIG. 2C is a flow chart of a process 286 for displaying data on an electronic display. Portions or all of process 286 of FIG. 2C may be implemented in one embodiment by instructions included in the capture control module 170 of FIG. 1A or the master control module 188 of FIG. 1B. Process 286 starts at start block 287 and then moves to block 288 where a first image is received. The image may be received for example from image sensors 115 or 116 of device 100, illustrated in FIG. 1A or from input 191 of device 180, illustrated in FIG. 1B. Process 286 then moves to block 289 where a second image is received. Similarly, the second image may also be received from an image sensor or an input device. Process 286 then moves to block 290, where the vertical disparity information is determined. The vertical disparity between the first image and the second image may be determined in several ways. For example, any of the methods discussed with reference to process 200, illustrated in FIG. 2A may be used. Alternatively, the disparity between the two images may be determined by receiving data also known as meta-information. Meta information may be received via an input device, such as input 191 of device 180, illustrated in FIG. 1B.

Process 286 then moves to decision block 291 where the vertical disparity is compared against a threshold. If the vertical disparity between the two images is below a threshold, process 286 transitions to block 292 where a correction is applied to the received first or second images. The correction may be based on disparity meta-information if received in block 290. Alternatively, it may be based on the results of the disparity determination methods discussed previously, such as the best fit of row sum vectors or row edge sum vectors. Process 286 then moves to block 294, where a stereoscopic image pair is created based on the corrected first and second images from block 292. Process 286 then transitions to block 295 where a stereoscopic image pair is displayed.

However, if the vertical disparity between the first and second images is above a threshold, process 286 moves from decision block 291 to processing block 296 where a two dimensional image is displayed. For example, only one of the two images that are included in the stereoscopic image pair may be displayed. The image displayed in block 296 or 295 may be displayed on display 125 of device 100, illustrated in FIG. 1A, or display 194 of device 180, illustrated in FIG. 1B. After either the stereoscopic image pair is displayed in block 295 or the two dimensional image is displayed in block 296, process 286 moves to end block 298.

Figure 4:
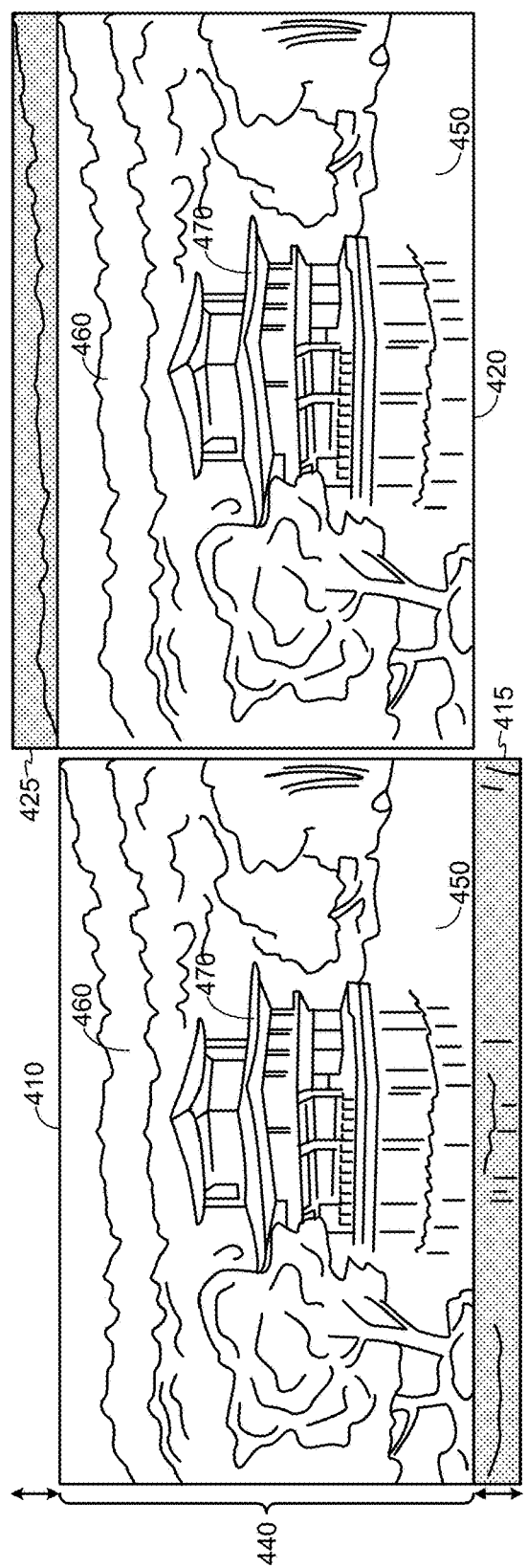
FIG. 4 illustrates vertical disparity between two images, and how one operative embodiment may crop the images to reduce or eliminate the vertical disparity.

One illustration of an image pair that can be cropped according to one embodiment of the process shown in block 240 of FIG. 2A, block 275 of FIG. 2B, or block 292 of FIG. 2C is illustrated by FIG. 4. Illustrated are two images of a building 470 on a lake 450. Image 410 was taken from a slightly lower perspective than image 420. Accordingly, image 410 includes a greater portion of the lake in its field of view, while image 420 includes a greater portion of the sky 460 in its field of view. The portions of each image not included in the other image are represented by the shaded portions of each image, identified as 415 and 425. As illustrated, the two images include significant vertical disparity, which may be eliminated before forming a stereoscopic image pair. To eliminate the vertical disparity, the shaded portion of each image 415 and 425 will be cropped, resulting in a final field of view represented by the common portion of the two images, identified by the bracketed area 440.

While some imaging environments allow the above techniques to successfully process the images captured from imaging sensor 115 and imaging sensor 116 to reduce or eliminate vertical disparity and produce a high quality stereoscopic image pair, some imaging environments may present disparities too great to be adequately compensated. Under such imaging conditions, it may be appropriate for the imaging device to avoid generating a stereoscopic image, as it may not be able to ensure adequate image quality. One implementation may for example, transition the imaging device into a two dimensional imaging mode. In such a mode, only one imaging sensor's image may be used to generate a traditional two dimensional image. For example, if the device was previously generating a stereoscopic video or movie, upon the vertical disparity exceeding a particular threshold, the device may begin generating a traditional two dimensional format, with the image frames generated from only a single imaging sensor. Alternatively, the device may continue to generate the stereoscopic video or movie but at a lower quality, while also provide an indicator that the quality level of the movie is below the threshold. In still other embodiments, the device may continue to generate a stereoscopic video, but a user prompt or other input receiving technique may be used to determine whether the user desires to continue display at a reduced quality level. Still other embodiments may continue to generate stereoscopic images regardless of the amount of vertical disparity.

In some imaging environments, despite a relatively high vertical disparity, the imaging device may be able to generate a stereoscopic image of adequate quality, but the field of view of the resulting stereoscopic image pair may be reduced below a threshold. In some embodiments, the imaging device may prompt or otherwise solicit input from the user as to whether they wish to continue display of the stereoscopic imaging application with a reduced field of view.

Figure 5:
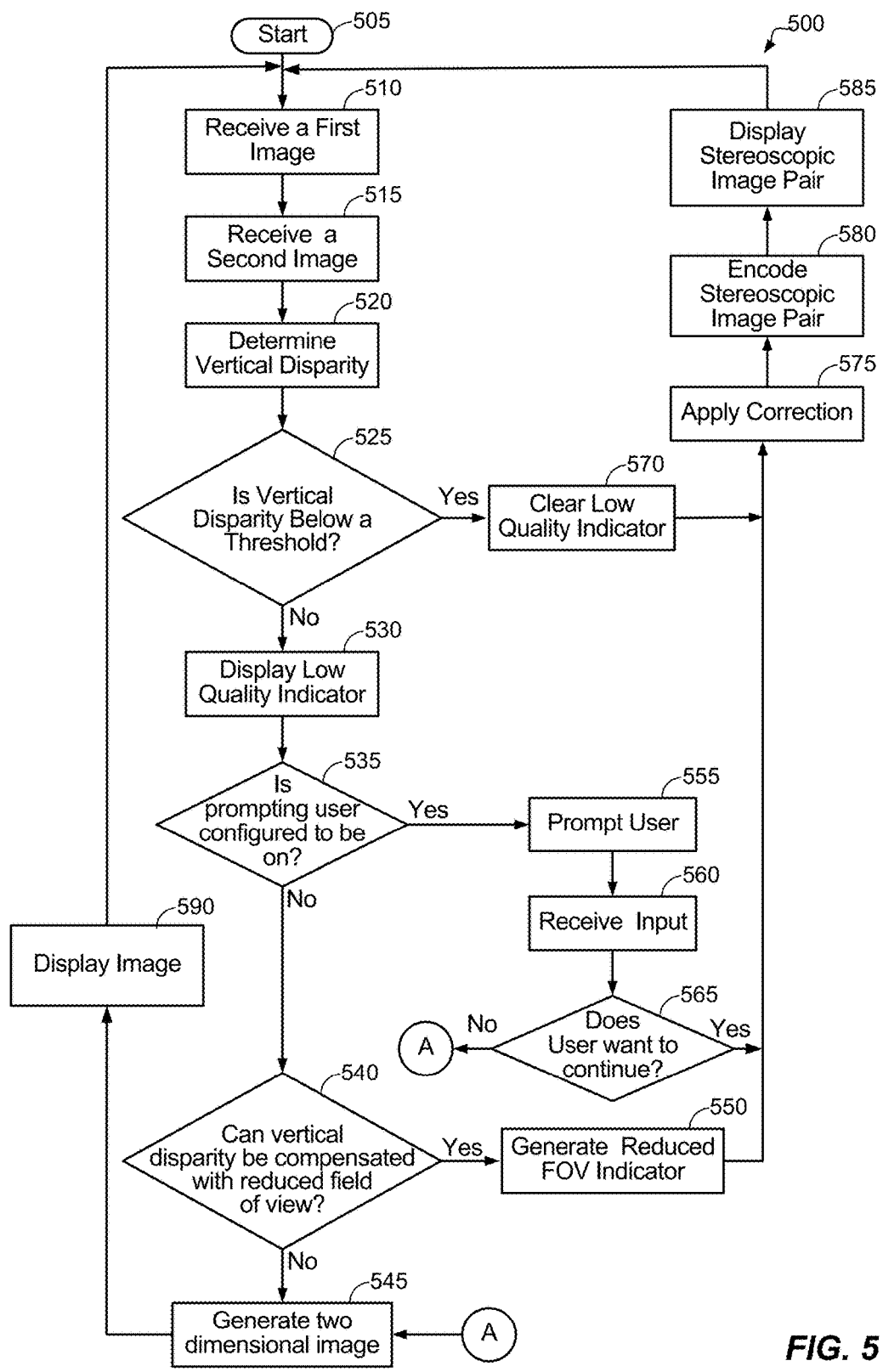
FIG. 5 is a flow chart depicting one embodiment of a process for displaying data on an electronic display.

FIG. 5 is a flow chart depicting one embodiment of a process used by a capture control module or master control module to display a stereoscopic image pair. Process 500 begins at start block 505 and then moves to block 510 where a first image is received. In some embodiments, the image may be received from image sensors 115 or 116 of FIG. 1A or input device 190 of FIG. 1B. Process 500 then moves to block 515 where a second image is received. Similar to the first image, in some embodiments the second image may also be received from an image sensor or an input device. Process 500 then moves to block 520, where the vertical disparity between the first image and the second image is determined. Block 520 may implement any of the disparity determination embodiments discussed above, to include row summation, row edge summation, or points of interest matching to determine the vertical disparity between the two images. Other techniques for aligning images are known in the art and may also be implemented. For example image registration techniques known in digital photography may also be utilized.

Note that alternative embodiments of process 500 determine vertical disparity in block 520 using other methods. For example, some embodiments may determine vertical disparity by receiving meta information indicating the vertical disparity that exists between the first image and the second image. The meta information may be received, for example, via input device 190 illustrated in FIG. 1B. The information may be received from a network, a storage device, or even another processor running within the display device itself.

Process 500 then moves to decision block 525, where the vertical disparity is compared against a threshold to determine whether correction to the disparity should be performed by the imaging processing instructions of device 100. For example, in some embodiments, the shift and crop module 165 of device 100 may provide a means for correcting the image, but certain vertical disparities may be beyond the capabilities of the shift and crop module's compensation capabilities. Additionally, with very large vertical disparities, the resulting stereoscopic image's field of view may become impractically small.

If a determination is made at the decision block 525 that the vertical disparity between the two images is below a threshold, process 500 moves to block 570, where any low quality indicator that may have been displayed is cleared.

Process 500 then moves to block 575, where a correction to the vertical disparity is applied to the first image, the second image, or both images. This correction may be applied by instructions included in the shift and crop module 155 of FIG. 1A or the shift and crop module 184 of FIG. 1B. Process 500 then moves to block 580, where the two images are encoded into a stereoscopic image pair. This encoding may be performed by instructions located in the encoding module 160 of FIG. 1A or encoding module 186 of device 180, illustrated in FIG. 1B. Process 500 then moves to block 585 where the stereoscopic image pair is displayed. The stereoscopic image may be displayed on display 125 of FIG. 1A or display 194 of FIG. 1B. The process 500 then returns to block 510 and the process 500 repeats.

If a determination is made at the decision block 525 that the vertical disparity between the two images is above a threshold, exception information may be displayed. Exception information may include indicators, such as quality or field of view indicators. Exception information may also include user prompts asking a user whether to continue with certain display capabilities, such as the display of stereoscopic image pairs. In the illustrated embodiment, process 500 moves to block 530 to generate a low quality indicator. In some embodiments, an indicator may be embedded into the stereoscopic image pair itself, so when displayed, the indicator is clearly visible to the user.

Alternatively a device running the process 500 may include other indicators, for example, lights or auxiliary display screens configured to display a quality indicator. The indicator may be displayed on the embedded display of such a device. Also, audible indicators may also be provided. For example, when the vertical disparity exceeds a threshold, a tone, beep, or spoken alert may be presented to the user.

Process 500 then moves to decision block 535, wherein instructions determine whether the device should prompt the user as to whether stereoscopic imaging should be continued. In the illustrated embodiment, configurable prompting provides flexibility in device behavior. For example, novice users may prefer to avoid being prompted, and instead rely on built in device logic to make decisions for them. More advanced users may prefer to have additional control over the stereoscopic imaging processes within their device. If prompting is enabled, process 500 moves to block 555, where the user is prompted. Prompting of the user may be accomplished in some embodiments by instructions included in master control module 188 or display control module 187 of FIG. 1B.

Next, process 500 moves to block 560, wherein instructions are executed to receive input from the user. Process 500 then moves to decision block 565, where instructions determine if the user's response indicated they wish to continue with stereoscopic imaging. If the user chooses to continue, process 500 moves through on page reference "A" to block 545, where instructions cause a two dimensional image to be generated. The two dimensional imaging mode may only utilize one of the two images received earlier in blocks 510 and 515. In some embodiments, the image generated by block 545 may be either an image from image sensor 1 or an image from image sensor 2. Alternatively, it may be an image received from an input, for example the input device 190 illustrated in FIG. 1B. Process 500 then moves to block 590 where the two dimensional image is displayed. In some embodiments, the two dimensional image may be displayed on display 125 of FIG. 1A or display 194 of FIG. 1B. Process 500 then repeats.

Note that although FIG. 5 illustrates a logic flow that would create a user prompt for every stereoscopic image pair captured with a vertical disparity above a threshold, one with ordinary skill in the art would recognize that additional logic may be implemented to avoid over prompting of the user. For example, a maximum number of prompts per minute/hour/day could be implemented. Alternatively, prompts might only be generated with substantial vertical disparity changes in the imaging environment. For example, thresholds may be established that define "low", "medium", and "high" amounts of vertical disparity. When the amount of vertical disparity crosses from one threshold to another, in some embodiments this may generate a prompt. For example, a first prompt might be displayed after some relatively small threshold is reached. If the user chooses to proceed, an additional prompt may be generated if the disparity were to reach a much more serious level. These variations are known in the art but are not illustrated here for conciseness.

Also note that while the embodiment illustrated in FIG. 5 is designed to interact with a "user", other embodiments may provide for alternate means of control. For example, some embodiments may, instead of prompting, generate control signals in the form of electronic messages to communicate the status of stereoscopic imaging. For example, a stereoscopic imaging device may be configured with input and output ports, with signals sent to the output port when certain thresholds in the stereoscopic imaging environment are crossed. These output ports could include wireless connections or hard wired connections over USB for example. Furthermore, the stereoscopic imaging device may accept input from an input port. For example, after generating an output signal indicating vertical disparity exceeds a particular threshold, some embodiments may accept input on an input port indicating whether stereoscopic imaging should be continued, whether the device should shift to two dimensional imaging mode, or perhaps whether imaging should be stopped completely.

If decision block 535 determines user prompting is not enabled, process 500 moves to decision block 540, wherein a determination is made whether compensating for the vertical disparity is possible, but with a reduced field of view. If the vertical disparity can be compensated, process 500 moves to block 550, where field of view exception information may be displayed. For example, in the illustrated embodiment, a reduced field of view indicator is generated. Process 500 then moves to block 575, and a correction is applied to the image, and process 500 then continues as described earlier.

If a determination is made at the decision state 540 that the vertical disparity is so great that an adequate image cannot be generated, even with a reduced field of view, then process 500 moves to block 545, and a two dimensional image is generated. Process 500 then displays the two dimensional image at a block 590 and returns to block 510 to repeat the process 500.

It should be realized that several variations are available for the illustrated embodiment of FIG. 5. For example, prompting of the user may not be configurable in some embodiments, and may be either unconditionally enabled or not performed. Other embodiments may prompt the user before generating a stereoscopic image pair with a significantly reduced field of view. Other embodiments may unconditionally transition to two dimensional imaging when vertical disparity reaches a threshold, without implementing the complexity of user prompting, field of view determination, or the generation of various indicators. FIG. 5 is intended to represent only one combination of these various methods of generating a stereoscopic image pair One can also appreciate that the embodiment illustrated in FIG. 5 includes some simplifications to facilitate discussion. For example, some embodiments will need to include processing logic to avoid excessive prompting of the user, for example, in edge case imaging environments that cause the vertical disparity to frequently transition from a value that can easily be corrected to a value that requires prompting by the user. Additionally, FIG. 5 illustrates no method for process 500 to end. However, some embodiments will employ additional conditional logic that enables a transition to an end state. For example, certain embodiments of device 100 may include a user actuated control that determines whether the imaging device is in stereoscopic imaging mode or traditional two dimensional mode. Actuation of this control may cause process 500 to exit. Alternatively, other embodiments may have a user actuated control that acts as a capture control button. When actuated, some embodiments may begin imaging if imaging is not currently in process, and end imaging if imaging is in process when the control is actuated. Actuation of such a control in some embodiments may end process 500.

Figure 6:
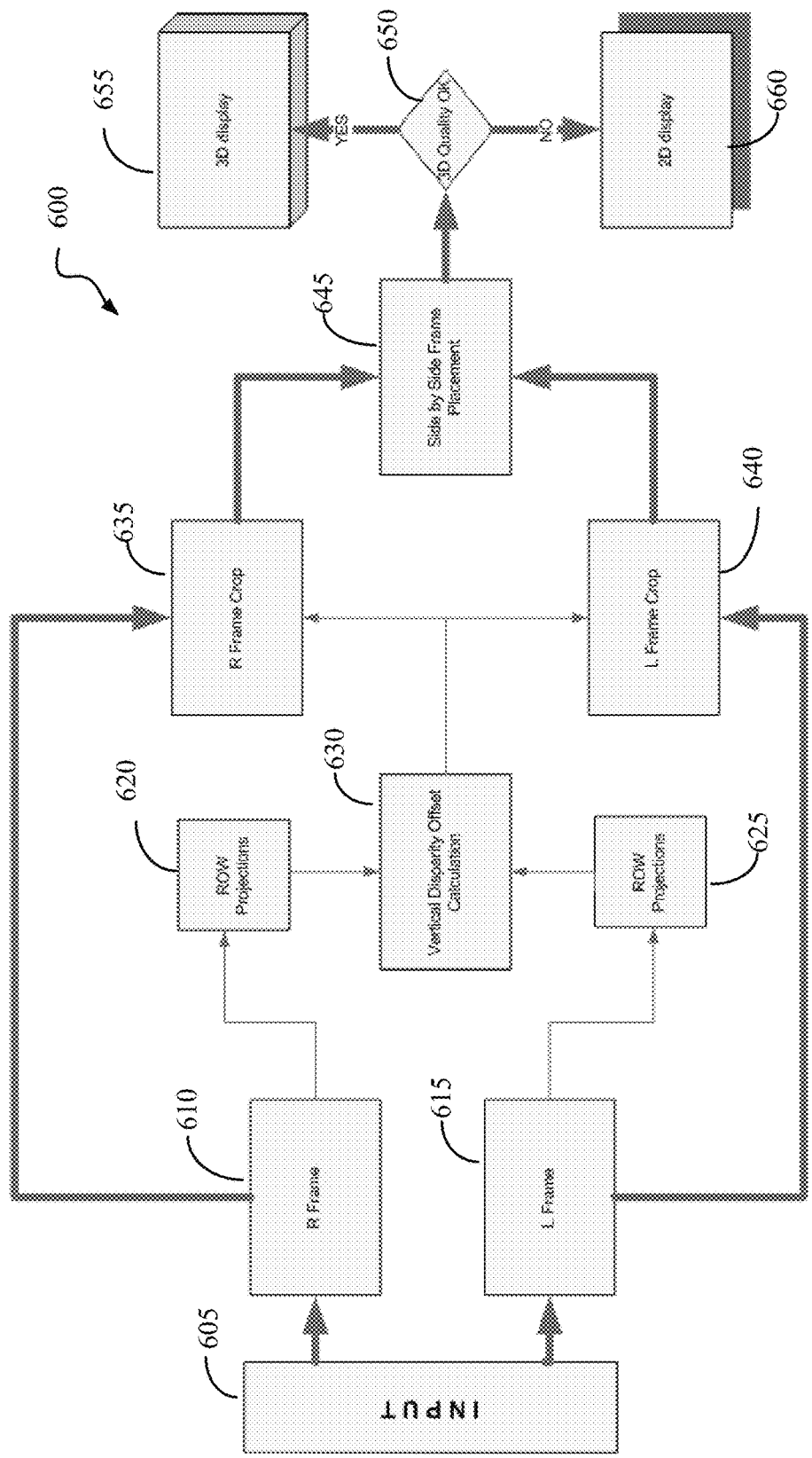
FIG. 6 is a data flow diagram depicting one embodiment of a process used by a master control module to display a stereoscopic image pair.

FIG. 6 is a data flow diagram for a method of displaying a stereoscopic image pair. The data flow begins on the left side of the diagram where a right frame 610 and a left frame 615 are received from an input 605. Next, row projections 620 and 625 are created and sent to block 630, where the vertical disparity between the two frames 610 and 615 is calculated. The result of this calculation is used to modify frames 610 and 615 to create left frame 640 and right frame 635. To adjust the vertical disparity of frames 610 and 615 each image may be cropped or shifted. After the shift or crop operation, images 635 and 640 may have improved quality with less vertical disparity when compared to images 610 and 615. The two frames are then encoded in a stereoscopic image pair at block 645. The stereoscopic image pair including images 635 and 640 is sent to decision block 650 where it is determined if the stereoscopic image quality is acceptable. If it is acceptable, process 600 moves to block 655 and the two images are displayed as a stereoscopic image. If the quality of the stereoscopic image pair is not acceptable, a two dimensional image is provided for display at block 660.

Figure 7:
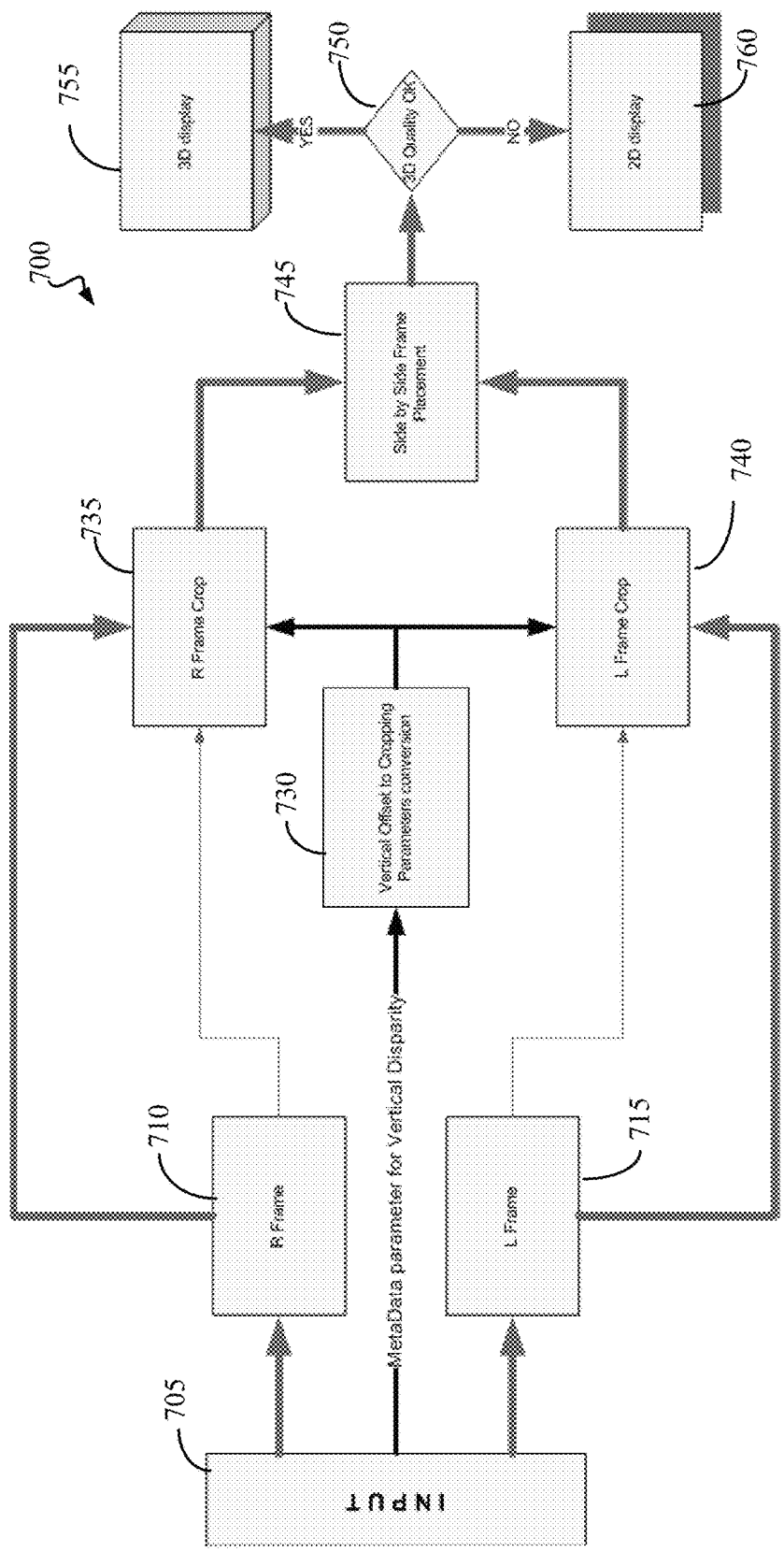
FIG. 7 is a data flow diagram depicting one embodiment of a process used by a master control module to display a stereoscopic image pair.

FIG. 7 is a data flow diagram for an alternative method for displaying a stereoscopic image pair. Similar to FIG. 6, a right frame 710 and a left frame 715 are received from an input 705. However, unlike dataflow 600 in FIG. 6, input 705 also provides metadata indicating the vertical disparity between the two frames 710 and 715. This metadata is translated into cropping control parameters 730 and new frames 735 and 740 are created based the original frames 710 and 715 and crop data 730. The vertical disparity of these corrected frames can then be evaluated at block 750, and if acceptable, a stereoscopic image 755 is displayed. Otherwise, a two dimensional image 760 is displayed.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method of displaying data on an electronic display, comprising:
    determining, via an electronic hardware processor, a vertical disparity between a first digital image and a second digital image representing left and right perspectives of a scene respectively, wherein a horizontal disparity represents a horizontal offset between the left and right perspectives; and
    correcting, via the electronic hardware processor, the vertical disparity between the first image and the second image by generating a corrected image;

displaying, on an electronic display, by the electronic hardware processor, the stereoscopic image pair in response to the corrected vertical disparity being below a first threshold; and displaying, on the electronic display, by the electronic hardware processor, a two dimensional image in response to the corrected vertical disparity exceeding a second threshold.

2. The method of claim 1, further comprising displaying a low quality indicator on the electronic display in response to the corrected vertical disparity being above the first threshold.

3. The method of claim 1, further comprising displaying a prompt asking whether to continue stereoscopic imaging on the electronic display in response to the corrected vertical disparity being above the first threshold.

4. The method of claim 1, further comprising displaying the stereoscopic image with a reduced field of view in response to the corrected vertical disparity exceeding the first threshold and being below the second threshold.

5. The method of claim 4, further comprising display a reduced field of view indicator in response to displaying the stereoscopic image with the reduced field of view.

6. An image processing device, comprising:
an electronic hardware processor;
an electronic hardware memory storing instructions that when executed, cause the electronic hardware processor to:
  determine a vertical disparity between a first digital image and a second digital image representing left and right perspectives of a scene respectively, wherein a horizontal disparity represents a horizontal offset between the left and right perspectives; and
  determine a vertical disparity between the first image and the second image,
  correct the vertical disparity between the first image and the second image by generating a corrected image;
  display the stereoscopic image pair on an electronic display in response to the corrected vertical disparity being below a threshold, and
  display a two dimensional image on the electronic display in response to the corrected vertical disparity being above a second threshold.

7. The device of claim 6, wherein the image processing device is a wireless telephone handset.

8. The device of claim 6, wherein the electronic hardware memory stores further instructions that cause the electronic processor to determine the vertical disparity by:
generating a first row sum vector for the first image,
generating a second row sum vector for the second image, and
determining a best fit for the first row sum vector and the second row sum vector.

9. The device of claim 6, wherein the electronic hardware memory stores further instructions that cause the electronic processor to determine vertical disparity by:
generating a first row edge sum vector for the first image,
generating a second row edge sum vector for the second image, and
determining a best fit for the first row edge sum vector and the second row edge sum vector.

10. The device of claim 9, wherein the best fit is determined by minimizing the sum of absolute difference values between two vectors.

11. The device of claim 6, wherein the electronic hardware memory stores further instructions that cause the electronic processor to display exception information when the vertical disparity is above the threshold.

12. The device of claim 6, wherein the electronic hardware memory stores instructions that cause the electronic processor to determine the vertical disparity at least in part by receiving meta information from an input device.

13. The device of claim 11, wherein the electronic hardware memory stores instructions that cause the electronic processor to generate a prompt asking whether to continue stereoscopic imaging in response to the vertical disparity being above a threshold.

14. The device of claim 6, wherein the electronic hardware memory stores further instructions that cause the electronic processor to display field of view exception information when a field of view of the stereoscopic image is below the second threshold.

15. The device of claim 14, wherein the electronic hardware memory stores further instructions that cause the electronic processor to:
  compare the corrected vertical disparity to the second threshold; and
  display the stereoscopic image pair with a reduced field of view in response to the corrected vertical disparity being above the first threshold and below the second threshold.

16. The device of claim 6, further comprising a data store, wherein the electronic hardware memory stores further instructions that cause the electronic processor to store the stereoscopic image pair to the data store.

17. The device of claim 6, further comprising an electronic display, wherein the electronic hardware memory stores further instructions that cause the electronic processor to display the stereoscopic image pair on the electronic display.

18. A non-transitory computer-readable storage medium storing instructions that when executed cause an electronic hardware processor to:
  receive a first image representing a left perspective of a scene from an input device;
  receive a second image representing a right perspective of the scene from an input device, wherein a horizontal disparity represents a horizontal offset between the left and right perspectives;
  determine a vertical disparity between the first image and the second image; and
  correct the vertical disparity between the first image and the second image by generating at least one corrected image;
  display a stereoscopic image pair on an electronic display in response to the corrected vertical disparity being below a first threshold; and
  display a two dimensional image derived from at least one of the first image or the second image on the electronic display in response to the corrected vertical disparity being above a second threshold.

19. The non-transitory computer readable medium of claim 18, further having stored thereon instructions that when executed cause the electronic hardware processor to display, on the electronic display, a prompt asking whether to continue stereoscopic imaging in response to the vertical disparity being above a threshold.

20. The non-transitory computer readable medium of claim 18, further having stored thereon instructions that when executed cause the electronic hardware processor to display, on the electronic display, the stereoscopic image pair with a reduced field of view in response to the corrected vertical disparity being below the second threshold and above the first threshold.

* * * * *